(12) United States Patent
Tatsukawa

(10) Patent No.: US 6,837,601 B2
(45) Date of Patent: Jan. 4, 2005

(54) LIGHTING SYSTEM FOR VEHICLE

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 35 days.

(21) Appl. No.: 10/323,420

(22) Filed: Dec. 18, 2002

(65) Prior Publication Data
US 2003/0112635 A1 Jun. 19, 2003

(30) Foreign Application Priority Data
Dec. 18, 2001 (JP) .................................. P. 2001-383964

(51) Int. Cl.$^7$ .............................................. F21V 17/02
(52) U.S. Cl. ...................... 362/512; 362/280; 362/319; 362/465
(58) Field of Search ................................. 362/277, 280, 362/319, 464–466, 512, 513

(56) References Cited

U.S. PATENT DOCUMENTS

| | | | | |
|---|---|---|---|---|
| 1,143,611 A | * | 6/1915 | Christensen et al. | 362/280 |
| 1,588,319 A | * | 6/1926 | Eisele | 362/280 |
| 1,602,289 A | * | 10/1926 | Tanner | 362/280 |
| 6,179,455 B1 | * | 1/2001 | Taniuchi | 362/513 |
| 6,286,985 B1 | * | 9/2001 | Ohshio et al. | 362/512 |
| 6,428,195 B1 | | 8/2002 | Ohshio et al. | 362/512 |
| 6,457,849 B2 | * | 10/2002 | Tsukamoto | 362/512 |

FOREIGN PATENT DOCUMENTS

| | | |
|---|---|---|
| GB | 2 345 747 A | 7/2000 |
| JP | 2001-325814 | 11/2001 |
| JP | 2001-325815 | 11/2001 |

* cited by examiner

Primary Examiner—Alan Cariaso
(74) Attorney, Agent, or Firm—Fish & Richardson P.C.

(57) ABSTRACT

A movable shade 26 for shielding a part of light emitted from a light source 22a toward a reflecting surface 24a of a reflector 24 is moved between two positions in a longitudinal direction by a shade driving device 28 according to a vehicle running situation, thereby changing a region in which the reflecting surface of the reflector 24 is to be utilized. More specifically, light emitted toward an outer peripheral region 24a2 of the reflecting surface 24a is shielded to permit only light incidence on an inner peripheral region 24a1 thereof when the movable shade 26 is moved to a forward position, while light emitted toward the inner peripheral region 24a1 of the reflecting surface 24a is shielded to permit only light incidence on the outer peripheral region 24a2 when the movable shade 26 is moved to a rearward position.

7 Claims, 9 Drawing Sheets

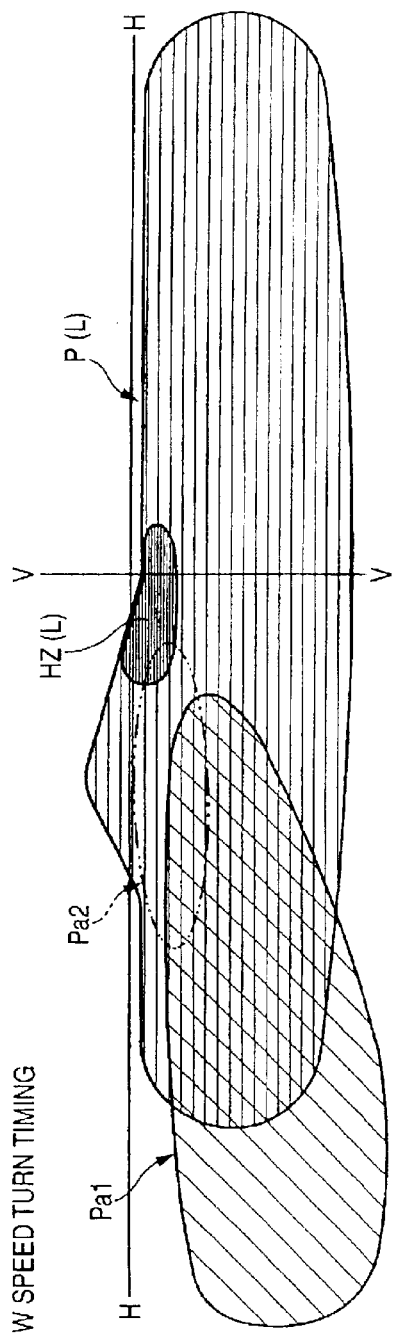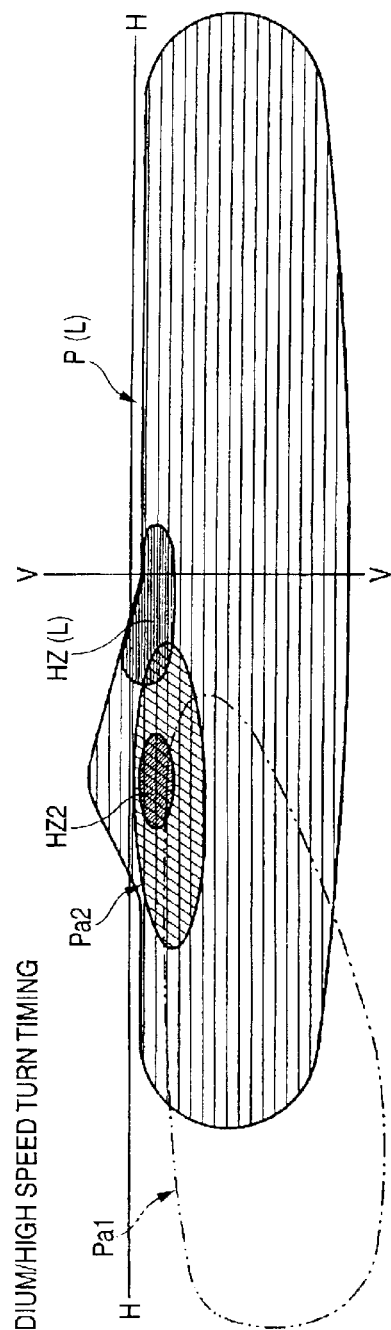
FIG. 5 (a) LOW SPEED TURN TIMING
FIG. 5 (b) MEDIUM/HIGH SPEED TURN TIMING

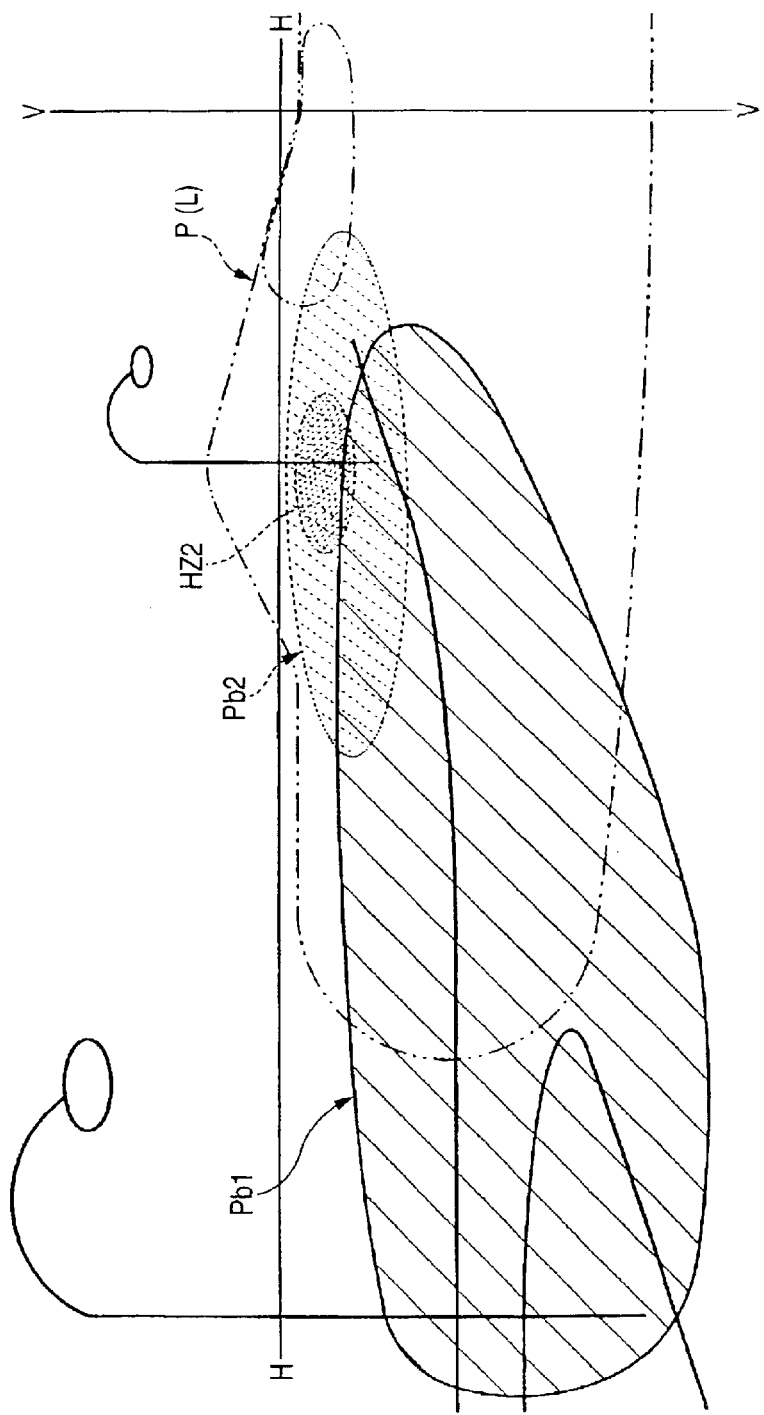
FIG. 6 LOW SPEED TURN TIMING

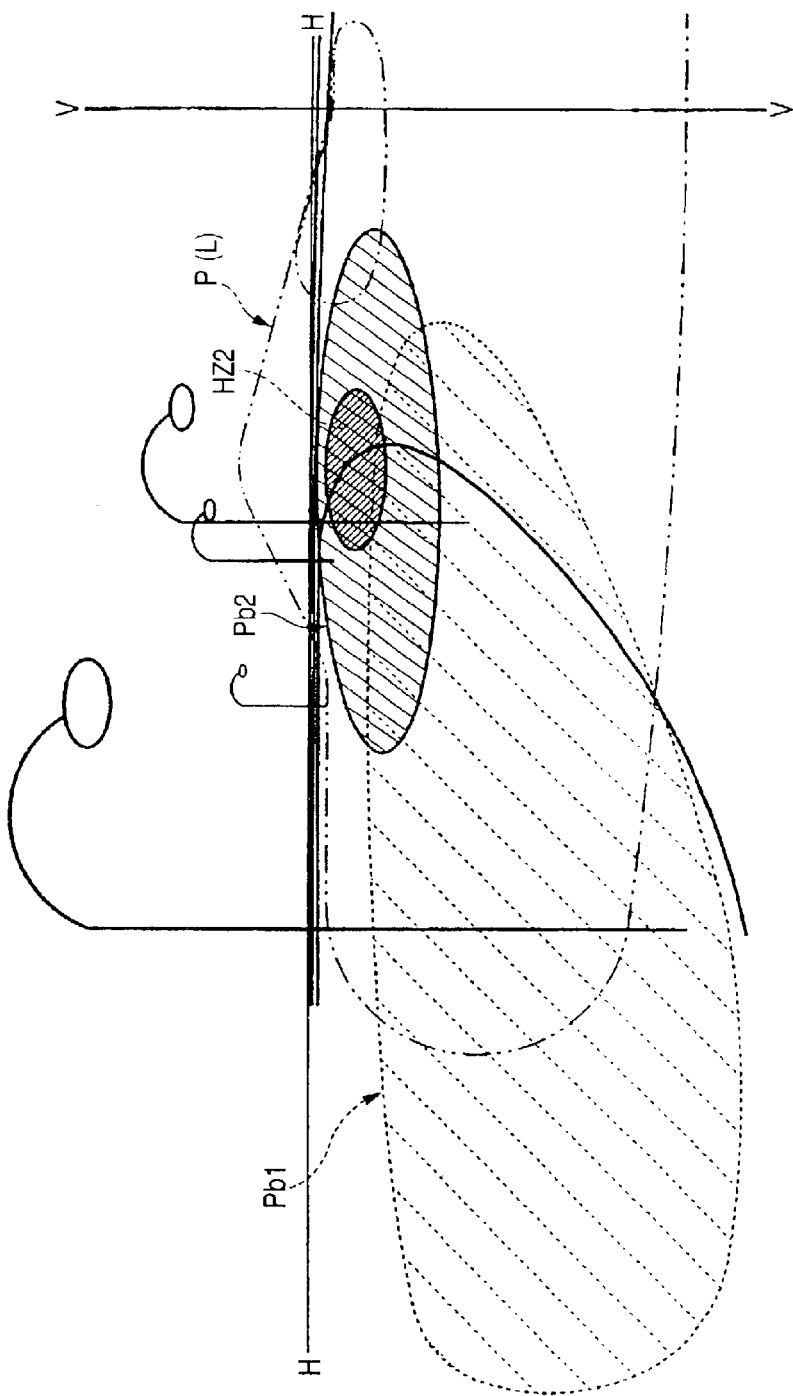
FIG. 7 MEDIUM/HIGH SPEED TURN TIMING

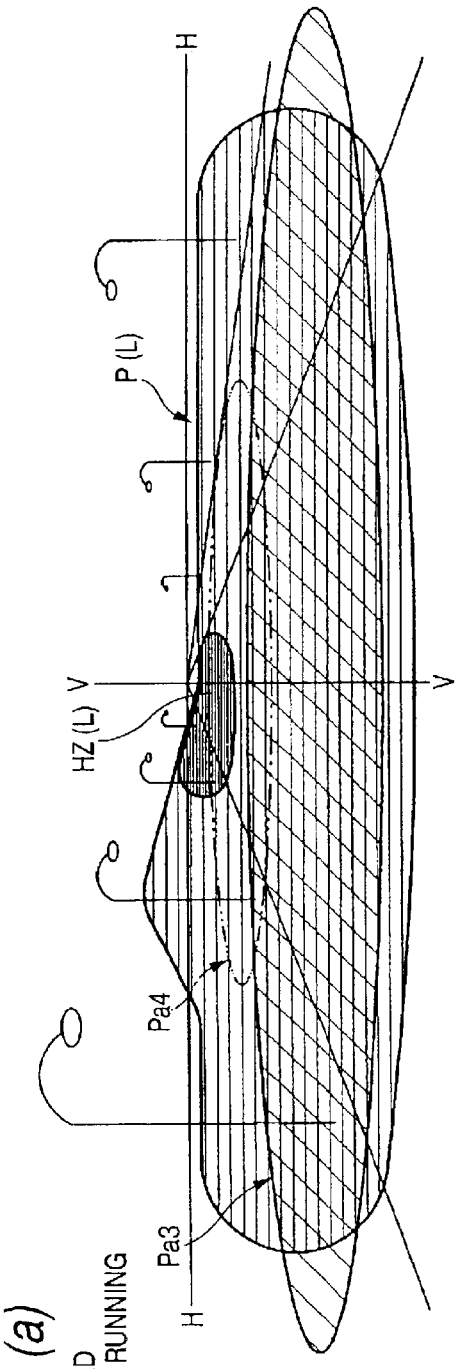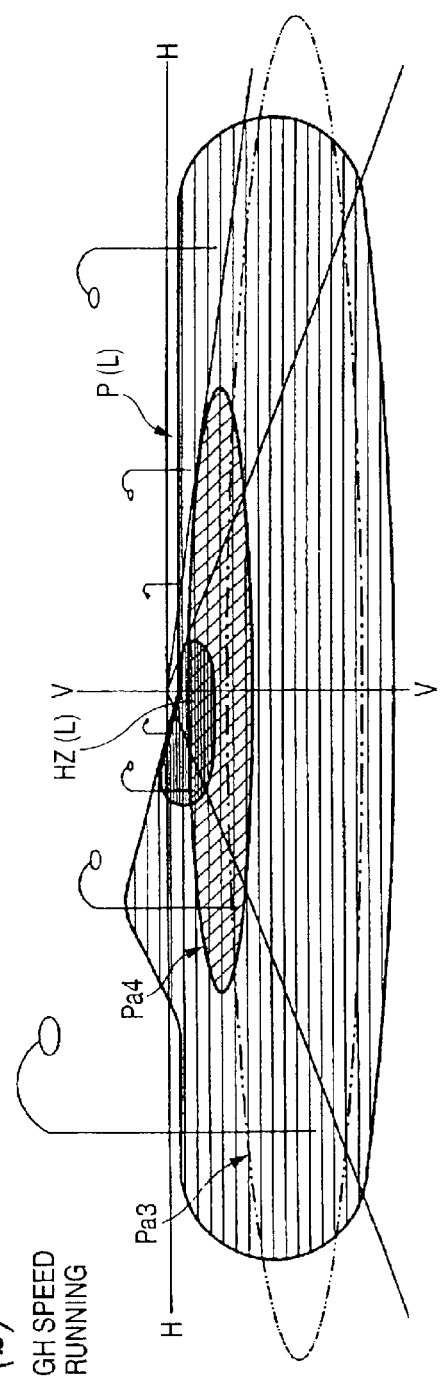
FIG. 8 (a) LOW SPEED STRAIGHT RUNNING
FIG. 8 (b) MEDIUM/HIGH SPEED STRAIGHT RUNNING

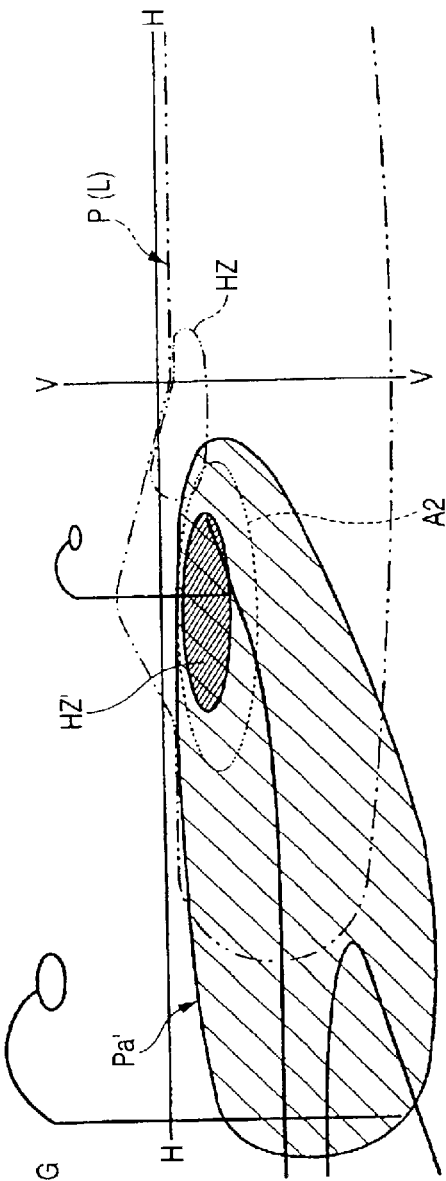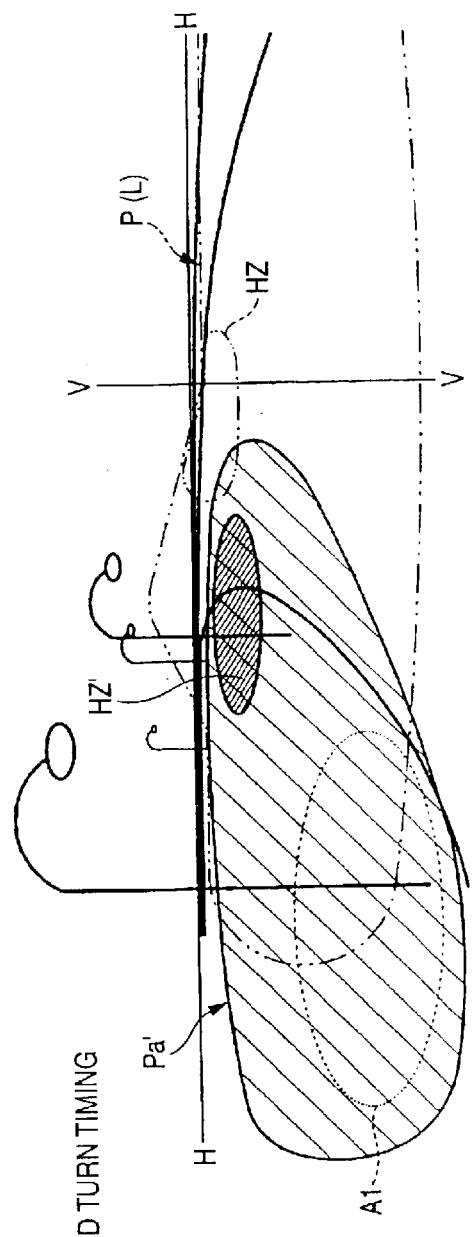
FIG. 9 (a) LOW SPEED TURN TIMING
FIG. 9 (b) MEDIUM/HIGH SPEED TURN TIMING

LIGHTING SYSTEM FOR VEHICLE

BACKGROUND OF THE INVENTION

1. Field of the Invention

The present invention relates to a lighting system for a vehicle which is constituted to carry out beam irradiation toward the forward road of the vehicle in a predetermined light distribution pattern.

2. Description of the Related Art

As one of the lighting systems for a vehicle besides or a part of a headlamp, which are constituted to carry out beam irradiation toward the forward road of the vehicle, a bending lamp has conventionally been known. The bending lamp is constituted to be turned on when the vehicle turns. Consequently, the visibility of a forward road in a turning direction can be enhanced.

FIG. 9 is a view perspectively showing a light distribution pattern Pa' formed on the forward road of the vehicle by the beam irradiation of the bending lamp when the vehicle turns in a leftward direction.

FIG. 9(a) shows a state in which the vehicle is making a left turn at a low speed on the forward intersection of the vehicle and FIG. 9(b) shows a state in which the vehicle is turning at medium and high speeds over a left curved road of a highway. In the drawings, a light distribution pattern P(L) shown in a two-dotted chain line indicates a low beam distribution pattern formed by the beam irradiation of a headlamp.

The light distribution pattern Pa' is wedge-shaped to be expanded in an obliquely downward direction from the vicinity of a hot zone (a region having a high luminous intensity) HZ of the low beam distribution pattern P(L) in a leftward direction and has a hot zone HZ' in an upper and rightward position. Consequently, the visibility of a forward road in a turning direction is maintained from low speed turning to medium and high speed turning.

However, since the conventional bending lamp is constituted to carry out beam irradiation in a single light distribution pattern Pa', there is the following problem.

More specifically, the visibility of a road at a short distance is deteriorated due to the brightness of a distant region A2 of the light distribution pattern Pa' during low speed turning in which the close observation point of a vehicle driver is set into the road at a short distance. On the other hand, the visibility of a distant road is deteriorated due to the brightness of a region A1 on this side of the light distribution pattern Pa' during medium and high speed turning in which the close observation point of the vehicle driver is set into the distant road.

Such a problem might arise in the same manner also in a lighting system for a vehicle other than the bending lamp.

SUMMARY OF THE INVENTION

The invention has been made in consideration of such circumstances and has an object to provide a lighting system for a vehicle which is constituted to carry out beam irradiation toward the forward road of the vehicle in a predetermined light distribution pattern, wherein the beam irradiation can be carried out in various light distribution patterns according to a vehicle running situation.

The invention can achieve the object by such a structure that a region in which the reflecting surface of a reflector is to be utilized can be changed by using a predetermined movable shade, thereby forming two kinds of light distribution patterns.

More specifically, the invention provides a lighting system for a vehicle having a light source and a reflector for forward reflecting light emitted from the light source and constituted to carry out beam irradiation toward a forward road of the vehicle in a predetermined light distribution pattern, the lighting system comprising:

a movable shade constituted to shield a part of light emitted from the light source toward a reflecting surface of the reflector, and a shade driving device for moving the movable shade between two positions in a longitudinal direction, wherein light emitted toward an outer peripheral region of the reflecting surface is shielded to permit only light incidence on an inner peripheral region of the reflecting surface when the movable shade is moved to a forward position, while light emitted toward the inner peripheral region of the reflecting surface is shielded to permit only light incidence on the outer peripheral region of the reflecting surface when the movable shade is moved to a rearward position.

The specific structure of the "lighting system for a vehicle" is not particularly restricted if it comprises a light source and a reflector for forward reflecting light emitted from the light source, and it is possible to employ a structure in which main light distribution control is carried out by the reflector or a structure in which a lens is provided in the forward part of the reflector and the main light distribution control is carried out by the lens.

The "lighting system for a vehicle" may be constituted to be turned on only when a headlamp is on or to be turned on independently of the headlamp, and furthermore, to be turned on only in a predetermined vehicle running situation such as turning, for example, or to be always turned on.

The specific structure of the "light source" is not particularly restricted but may be the discharge light emitting section of a discharge bulb or the filament of an incandescent bulb such as a halogen bulb.

If the "movable shade" is constituted to shield a part of light emitted from the light source toward the reflecting surface of the reflector or is constituted to be movable between two positions in a longitudinal direction, a specific structure thereof, for example, a shape or a size is not particularly restricted.

The specific structure of the "shade driving device" is not particularly restricted if it is constituted such that the movable shade is moved between the two positions in the longitudinal direction, and can utilize a solenoid or a pulse motor, for example. Moreover, the manner of the "movement" of the movable shade by the shade driving device is not particularly restricted but rotation or straight reciprocation can be employed, for example.

A specific structure such as the shape, size or luminous intensity distribution of a light distribution pattern formed by the light reflected from each of the "inner peripheral region" and the "outer peripheral region" of the reflecting surface is not particularly restricted. Moreover, the "inner peripheral region" and the "outer peripheral region" are not always regions set to completely divide the reflecting surface into two regions but may be regions to partially overlap each other or regions set to be separated from each other.

As shown in the structure, the lighting system for a vehicle according to the invention has such a structure that the movable shade constituted to shield a part of the light emitted from the light source toward the reflecting surface of the reflector is moved between the two positions in the longitudinal direction by the shade driving device. The movable shade shields the light emitted toward the outer peripheral region of the reflecting surface to permit only light incidence on the inner peripheral region when moving to the forward position, while it shields the light emitted toward the inner peripheral region of the reflecting surface to permit only the light incidence on the outer peripheral region when moving to the rearward position. Therefore, the following functions and effects can be obtained.

More specifically, the region in which the reflecting surface of the reflector is to be utilized can be changed by the movement of the movable shade. Therefore, it is possible to cause a light distribution pattern formed by the light reflected from the inner peripheral region of the reflecting surface and a light distribution pattern formed by the light reflected from the outer peripheral region of the reflecting surface to have shapes, sizes and formation positions which are different from each other. Consequently, it is possible to easily carry out beam irradiation in a light distribution pattern according to a vehicle running situation by properly driving the shade driving device to move the movable shade.

According to the invention, thus, in the lighting system for a vehicle which is constituted to carry out the beam irradiation toward the forward road of the vehicle in the predetermined light distribution pattern, it is possible to carry out the beam irradiation in various light distribution patterns according to the vehicle running situation. Consequently, it is possible to sufficiently enhance the visibility of the forward road of the vehicle.

In general, a light source image formed by the light reflected from the outer peripheral region of the reflecting surface is smaller than a light source image formed by the light reflected from the inner peripheral region of the reflecting surface. Accordingly, the outer peripheral region of the reflecting surface is suitable for forming a small light distribution pattern with a high luminous intensity, and furthermore, the inner peripheral region of the reflecting surface is suitable for forming a uniform and large light distribution pattern.

If the beam irradiation position of the lighting unit for the forward road of the vehicle is set to be a position on the more distant side when the movable shade is moved to the rearward position than when the movable shade is moved to the forward position, the distant road can be irradiated with a sufficient brightness, and furthermore, the road at a short distance can be widely irradiated almost uniformly.

In that case, if the shade driving device is constituted to move the movable shade to the forward position at a predetermined set vehicle speed or less and to move the movable shade to the rearward position when a set vehicle speed is exceeded, a distant road is rarely irradiated but a road at a short distance can be widely irradiated almost uniformly during low speed running in which a vehicle driver closely observes the road at a short distance, while the road at a short distance is rarely irradiated but the distant road can be irradiated brightly during medium and high speed running in which the vehicle driver closely observes the distant road. Consequently, the forward road of the vehicle is irradiated in a light distribution pattern corresponding to the close observation point of the vehicle driver from the low speed running to the medium and high speed running. Thus, the visibility can be enhanced still more.

The lighting system for a vehicle according to the invention is not restricted to special kinds of lighting systems. In the case of a bending lamp constituted to irradiate a forward part in a turning direction when the vehicle turns, the visibility of the forward road in the turning direction can be maintained sufficiently. Therefore, a running safety can be enhanced during turning. It is a matter of course that a state in which the turning is actually carried out corresponds to "during turning". At the present time, the turning has not been carried out yet but the "during turning" may include a state in which the turning will be apparently carried out in the near future (for example, a turn signal lamp is operated).

BRIEF DESCRIPTION OF THE DRAWINGS

FIGS. 5(a) and 5(b) show light distribution patterns formed on a virtual vertical screen provided in a forward position of 25 m from a lighting system by the beam irradiation of the bending lamp together with a low beam distribution pattern formed by the beam irradiation of a headlamp, FIG. 6 is a view perspectively showing a light distribution pattern formed on the forward road of a vehicle by the beam irradiation of the bending lamp when the vehicle turns in a leftward direction at a low speed, FIG. 7 is a view perspectively showing a light distribution pattern formed on the forward road of the vehicle by the beam irradiation of the bending lamp when the vehicle turns in the leftward direction at medium and high speeds, FIGS. 8(a) and 8(b) show the perspective views of light distribution patterns formed on the virtual vertical screen by the beam irradiation of a lighting system for a vehicle according to a variant of the embodiment together with a low beam distribution pattern formed by the beam irradiation of a headlamp, and FIGS. 9(a) and 9(b) show the functions of a conventional example in the same manner as FIGS. 5 and 6.

DESCRIPTION OF THE PREFERRED EMBODIMENTS

An embodiment of the invention will be described below with reference to the drawings.

Figure 1:
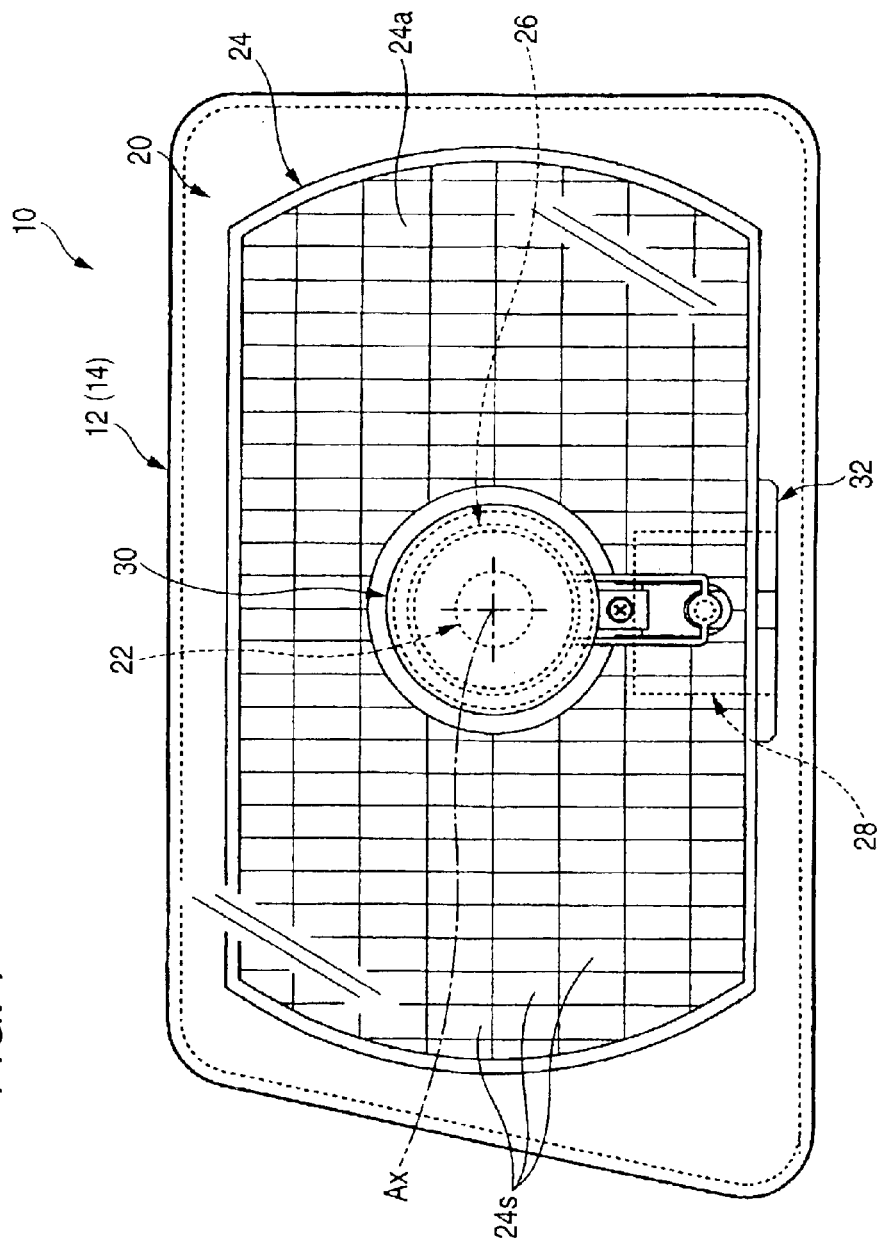
FIG. 1 is a front view showing a bending lamp according to an embodiment of the invention.

FIG. 1 is a front view showing a lighting system 10 for a vehicle according to an embodiment of the invention.

As shown, the lighting system 10 for a vehicle is a bending lamp constituted to irradiate a forward road in a turning direction when a vehicle turns in a leftward direction, and a lighting unit 20 is accommodated in a lamp housing formed by a plain and translucent cover 12 and a lamp body 14.

The bending lamp 10 is turned on when the vehicle turns in the leftward direction in a state in which a headlamp (not shown) is turned on.

Figure 2:
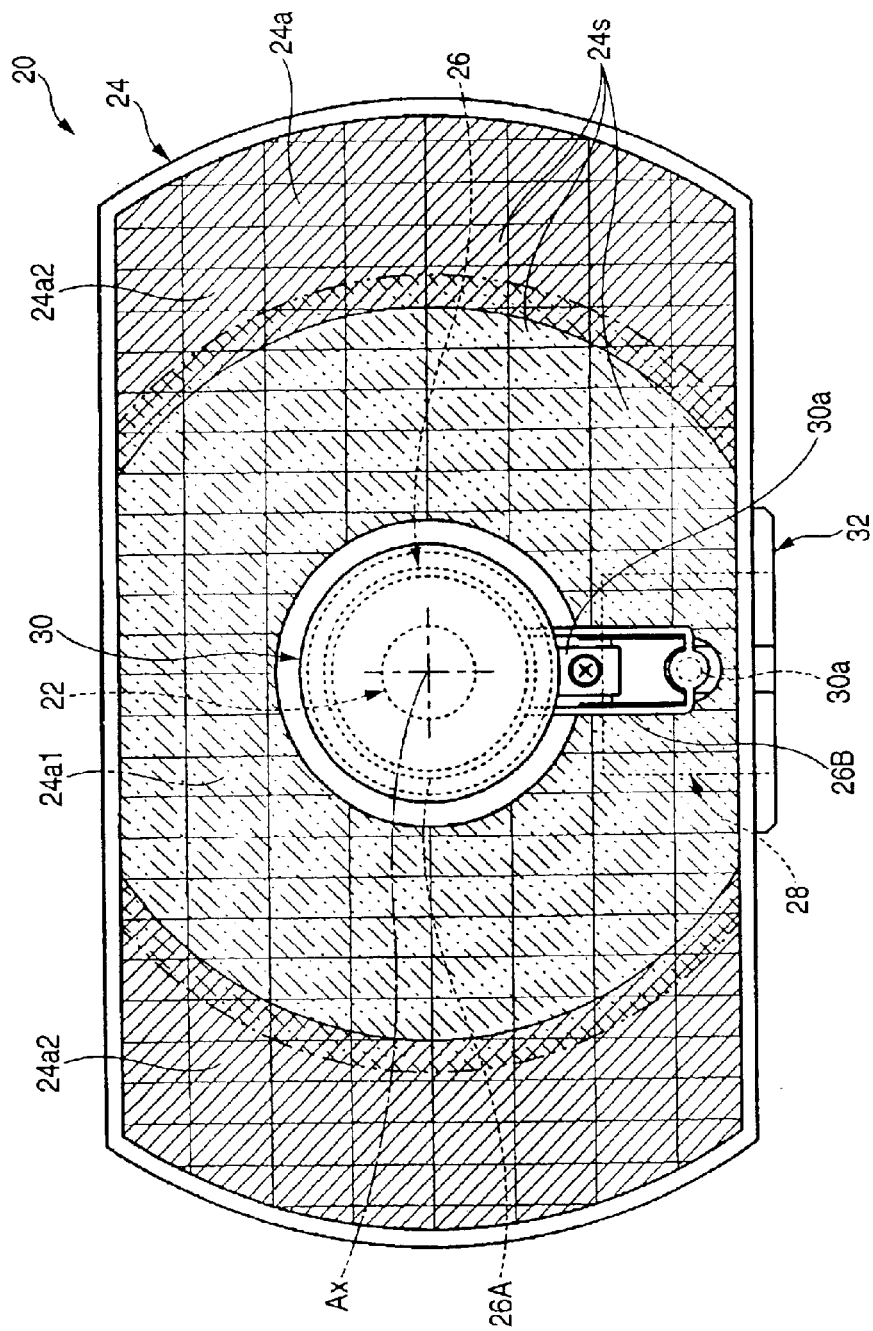
FIG. 2 is a front view showing, as a single member, a lighting system unit of the bending lamp.
Figure 3:
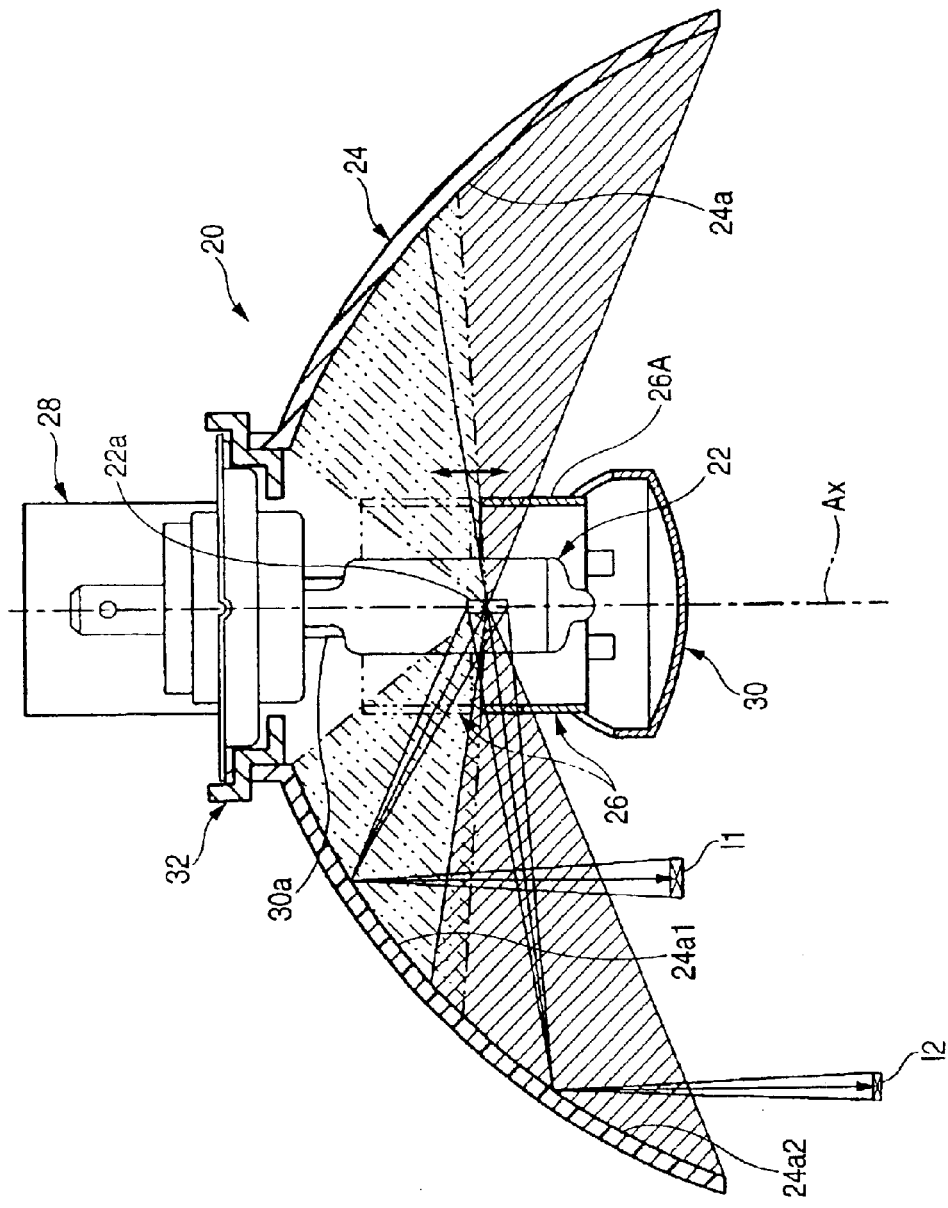
FIG. 3 is a sectional plan view showing the lighting system unit as a single member.
Figure 4:
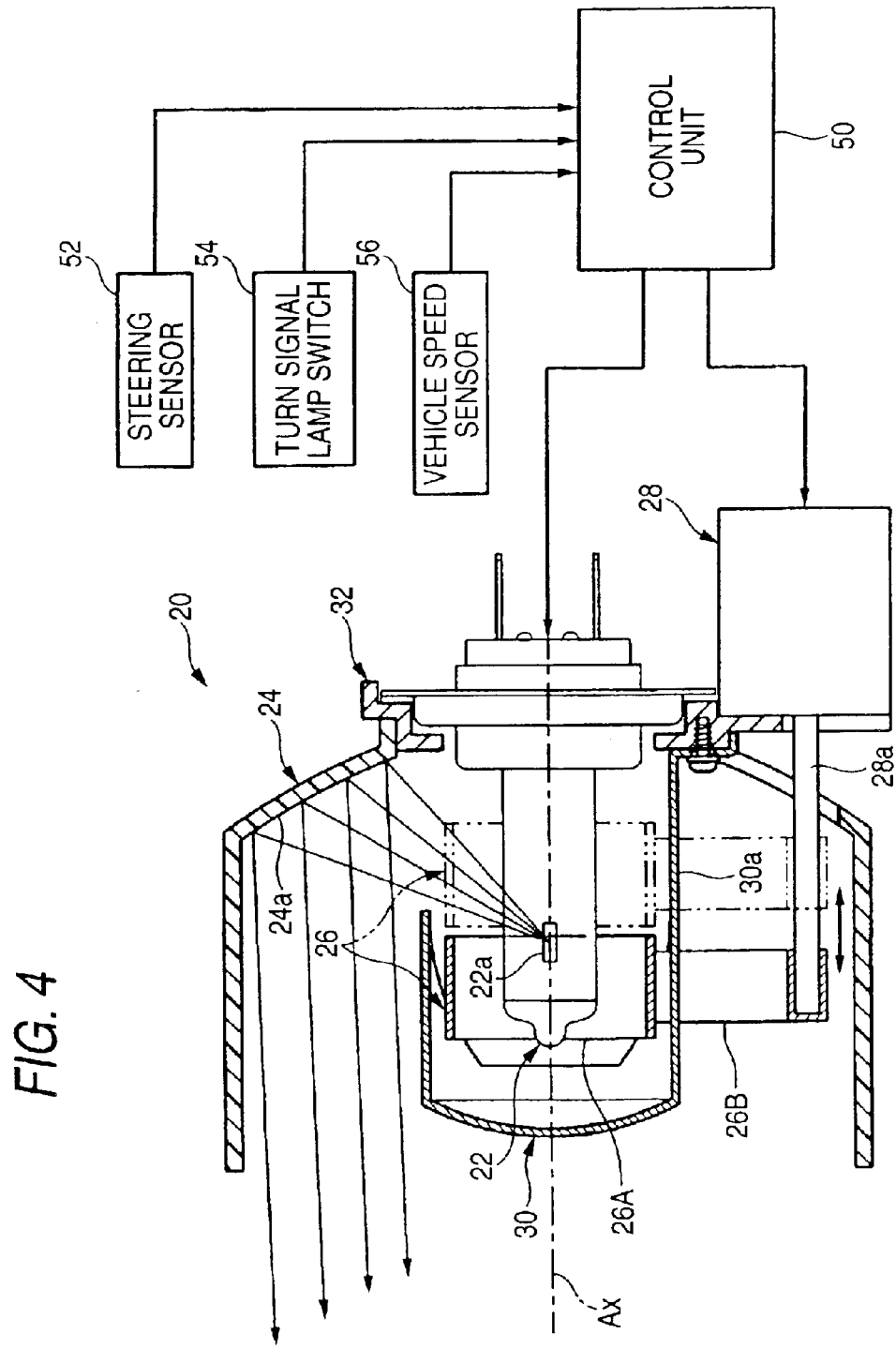
FIG. 4 is a sectional side view showing the lighting system unit as a single member.

FIGS. 2, 3 and 4 are a front view, a sectional plan view and a sectional side view showing the lighting unit 20 as a single member.

As shown in these drawings, the lighting unit 20 comprises a light source bulb (an H7 halogen bulb of a single filament type) 22, a reflector 24, a movable shade 26, a shade driving device 28, and a fixing shade 30.

The light source bulb 22 is supported on the reflector 24 through a bulb support member 32 such that a filament (light source) 22a is positioned on an optical axis Ax extended in the longitudinal direction of the vehicle.

The reflector 24 has a reflecting surface 24a having a plurality of reflecting elements 24s formed on a rotating paraboloid setting the optical axis Ax to be a central axis, and light emitted from the light source 22a is forward diffused, deflected and reflected by each reflecting element 24s constituting the reflecting surface 24a.

The movable shade 26 includes a shade body 26A for cylindrically covering the light source bulb 22 like a strip, and a stay 26B extended downward from the lower end of the shade body 26A, and is provided reciprocably in a longitudinal direction and can take a forward position shown in a solid line of the drawing and a rearward position shown in a two-dotted chain line of the drawing.

The movement of the movable shade 26 is carried out by the driving operation of the shade driving device 28. The shade driving device 28 is constituted by a solenoid with a built-in return spring, and is fixed to the bulb support member 32 below the light source bulb 22 such that a plunger 28a is protruded forward. The lower end of the stay 26B of the movable shade 26 is fixed to the tip portion of the plunger 28a of the shade driving device 28.

The shade driving device 28 is driven and controlled according to a vehicle speed by a control unit 50 (which will be described later). More specifically, the solenoid of the shade driving device 28 is excited to advance the plunger 28a to a position shown in a solid line and to move the movable shade 26 into a forward position when the vehicle speed. is low, that is, a predetermined set vehicle speed (for example, 40 km/h) or less, while the excitation of the solenoid is released to retreat the plunger 28a to a position shown in a two-dotted chain line by the elastic force of a return spring and to move the movable shade 26 to a rearward position when the vehicle speed exceeds the set vehicle speed to medium and high speeds.

As shown in FIGS. 2 and 3, light emitted toward an outer peripheral region 24a2 of the reflecting surface 24a is shielded by the shade body 26A to permit only light incidence on an inner peripheral region 24a1 of the reflecting surface 24a when the movable shade 26 is moved to the forward position, while light emitted toward the inner peripheral region 24a1 of the reflecting surface 24a is shielded by the shade body 26A to permit only light incidence on the outer peripheral region 24a2 of the reflecting surface 24a when the movable shade 26 is moved to a rearward position. In that case, the amount of longitudinal movement of the movable shade 26 is set such that the outer peripheral edge portion of the inner peripheral region 24a1 and the outer peripheral edge portion of the outer peripheral region 24a2 slightly overlap each other.

The fixing shade 30 is provided in the vicinity of the forward part of the movable shade 26 to shield unnecessary light emitted from the light source bulb 22 in a direction other than the reflecting surface 24a of the reflector 24. The fixing shade 30 is screwed to the bulb support member 32 at the rear end of a stay 30a extended rearward from a lower end thereof.

As shown in FIG. 4, the ON/OFF control of the light source bulb 22 and the driving control of the shade driving device 28 are carried out by the control unit 50.

A detection signal is input from a steering sensor 52, a turn signal lamp switch 54 and a vehicle speed sensor 56 to the control unit 50.

The control unit 50 turns on the light source bulb 22 when detecting that a steering operation for turning the vehicle in the leftward direction is carried out in response to the signal input from the steering sensor 52 or a winker operation is carried out (the turn signal lamp is operated) in response to the signal input from the turn signal lamp switch 54, and turns off the light source bulb 22 in other cases.

Moreover, the control unit 50 excites the solenoid of the shade driving device 28 to move the movable shade 26 to a forward position based on the signal input from the vehicle speed sensor 56 when the vehicle speed is low, that is, is equal to or lower than the set vehicle speed, while it releases the excitation to move the movable shade 26 to a rearward position when the vehicle speed exceeds the set vehicle speed to medium and high speeds.

FIG. 5 is a view showing a light distribution pattern formed on a virtual vertical screen provided in a position of 25 m in the forward part of a lighting system by the beam irradiation of the bending lamp 10 together with a low beam light distribution pattern P(L) formed by the beam irradiation of a headlamp.

FIG. 5(a) shows a light distribution pattern Pa1 formed during low speed turning (that is, in such a state that the movable shade 26 is moved to the forward position) and FIG. 5(b) shows a light distribution pattern Pa2 formed during medium and high speed turning (that is, in such a state that the movable shade 26 is moved to the rearward position).

The light distribution pattern Pa2 is a small light distribution pattern having a comparatively high luminous intensity which is extended flatly in a leftward direction from the vicinity of a hot zone (a high luminous intensity region) HZ of a low beam light distribution pattern P(L) in the vicinity of a portion provided under an H—H line (a horizontal line passing through the optical axis Ax) and has a hot zone HZ2 in an upper position thereof. On the other hand, the light distribution pattern Pa1 is a large light distribution pattern having an almost uniform luminous intensity which is almost wedge-shaped to be extended in an obliquely downward direction from the light distribution pattern Pa2 in the leftward direction.

As shown in FIG. 3, a light source image I2 formed by light reflected by the outer peripheral region 24a2 of the reflecting surface 24a of the reflector 24 is smaller than a light source image I1 formed by light reflected from the inner peripheral region 24a1 of the reflecting surface 24a. In the embodiment, the small light distribution pattern Pa2 having a high luminous intensity is formed by utilizing the outer peripheral region 24a2 of the reflecting surface 24a, while the large light distribution pattern Pa1 having an almost uniform luminous intensity is formed by utilizing the inner peripheral region 24a1 of the reflecting surface 24a.

FIG. 6 is a view perspectively showing the light distribution pattern Pa1 formed on the forward road of a vehicle by the beam irradiation of the bending lamp 10 when the vehicle turns at a low speed in the leftward direction, illustrating a state in which a left turn is being made at a low speed on an intersection in front of the vehicle.

When the vehicle makes a left turn, the turn signal lamp is operated so that the bending lamp 10 is turned on. In that case, generally, the vehicle runs at a low speed to make a left turn. By the beam irradiation of the bending lamp 10, therefore, the light distribution pattern Pa1 is formed on the forward road of the vehicle. Consequently, a road at a short distance which is closely observed by a vehicle driver is widely irradiated almost uniformly. At this time, since the light distribution pattern Pa2 is not formed, a distant road is rarely irradiated. Consequently, it is possible to prevent the road at a short distance from being seen with difficulty due to the brightness of the light distribution pattern Pa2. Accordingly, it is possible to sufficiently enhance the visibility of the forward road of the vehicle during the left turn.

FIG. 7 is a view perspectively showing the light distribution pattern Pa2 formed on the forward road of the vehicle by the beam irradiation of the bending lamp 10 when the vehicle turns at medium and high speeds in the leftward direction, illustrating a state in which the vehicle turns over the left curved road of a highway.

As shown in FIG. 7, when the vehicle turns over the left curved road, a steering operation is carried out so that the bending lamp 10 is turned on. In that case, generally, the vehicle runs at medium and high speeds over the highway. By the beam irradiation of the bending lamp 10, therefore, the light distribution pattern Pa2 is formed on the forward road of the vehicle. Consequently, a forward part in the turning direction of a distant road which is closely observed by the vehicle driver is irradiated brightly. At this time, since the light distribution pattern Pa1 is not formed, a road at a short distance is rarely irradiated. Consequently, it is possible to prevent the distant road from being seen with difficulty due to the brightness of the light distribution pattern Pa1. Accordingly, it is possible to sufficiently enhance the visibility of the forward road of the vehicle during turning over the left curved road of the highway.

As described above in detail, the lighting system 10 for a vehicle according to the embodiment has such a structure that the movable shade 26 constituted to shield a part of the light emitted from the light source 22a toward the reflecting surface 24a of the reflector 24 is moved between the two positions in the longitudinal direction by the shade driving device 28. The movable shade 26 shields the light emitted toward the outer peripheral region 24a2 of the reflecting surface 24 to permit only the light incidence on the inner peripheral region 24a1 when moving to the forward position, while it shields the light emitted toward the inner peripheral region 24a1 of the reflecting surface 24a to permit only the light incidence on the outer peripheral region 24a2 when moving to the rearward position. Therefore, the following functions and effects can be obtained.

More specifically, the region in which the reflecting surface of the reflector 24 is to be utilized can be changed by the movement of the movable shade 26. Therefore, the light distribution pattern Pa1 formed by the light reflected from the inner peripheral region 24a1 of the reflecting surface 24a and the light distribution pattern Pa2 formed by the light reflected from the outer peripheral region 24a2 of the reflecting surface 24a can be set to have different shapes, sizes and formation positions from each other. Therefore, it is possible to easily carry out the beam irradiation in a light distribution pattern according to a vehicle running situation by properly driving the shade driving device 28 to move the movable shade 26. Thus, it is possible to sufficiently enhance the visibility of the forward road of the vehicle.

In the embodiment, particularly, the beam irradiation is carried out for the road at a short distance in the large light distribution pattern Pa1 and the beam irradiation is carried out for the distant road in the small light distribution pattern Pa2. In the inner peripheral region 24a1 of the reflecting surface 24a forming the light distribution pattern Pa1, a light source image I1 of the reflected light is enlarged. Therefore, it is possible to easily form the larger light distribution pattern Pa1 with an almost uniform luminous intensity. On the other hand, in the outer peripheral region 24a2 of the reflecting surface 24a forming the light distribution pattern Pa2, a light source image I2 of the reflected light is reduced. Therefore, it is possible to easily form the small light distribution pattern Pa2 with a high luminous intensity.

In the embodiment, moreover, the shade driving device 28 moves the movable shade 26 to the forward position at the predetermined set vehicle speed or less, while it moves the movable shade 26 to the rearward position when the set vehicle speed is exceeded. During low speed turning in which the vehicle driver closely observes the road at a short distance in the forward part in the turning direction, therefore, the distant road is rarely irradiated and the road at a short distance can be widely irradiated almost uniformly in the large light distribution pattern Pa1. On the other hand, during medium and high speed turning in which the vehicle driver closely observes the distant road in the forward part in the turning direction, the road at a short distance is rarely irradiated and the distant road can be irradiated brightly in the small light distribution pattern Pa2. Consequently, the forward road in the turning direction can be irradiated in such a light distribution pattern as to correspond to the close observation point of the vehicle driver from the low speed turning to the medium and high speed turning, thereby sufficiently maintaining the visibility thereof. Consequently, it is possible to sufficiently enhance a running safety during the turning.

In the embodiment, there has been described the case in which the lighting system 10 for a vehicle is a bending lamp constituted to irradiate the forward road in the turning direction when the vehicle turns in the leftward direction. Also in the case of a bending lamp constituted to irradiate the forward road in the turning direction when the vehicle turns in a rightward direction, it is possible to obtain the same functions and effects as those in the embodiment by employing the same lighting system structure as that in the embodiment.

Moreover, the bending lamp 10 according to the embodiment may employ a structure in which a headlamp is turned on only in a low beam irradiation state or a structure in which the headlamp is turned on also in a high beam irradiation state. Alternatively, the bending lamp 10 may be constituted to be turned on independently of the headlamp.

Furthermore, while the bending lamp 10 according to the embodiment has such a structure as to fulfill the light distribution control function by the reflector 24, it may be constituted to fulfill the light distribution control function by forming a lens element in the translucent cover 12.

In the embodiment, there has been described a lighting system structure for carrying out the beam irradiation in two kinds of light distribution patterns Pa1 and Pa2 in the bending lamp 10 to be turned on when the vehicle turns. If the shape of the reflecting surface 24a is set such that a light distribution pattern Pa3 shown in FIG. 8(a) is formed by the light reflected from the inner peripheral region 24a1 of the reflecting surface 24a and the beam irradiation is carried out in a light distribution pattern Pa4 shown in FIG. 8(b) by the light reflected from the outer peripheral region 24a2 of the reflecting surface 24a, it is possible to carry out the beam irradiation in the two kinds of light distribution patterns Pa3 and Pa4 also when the vehicle runs straight by the same lighting system structure as that in the embodiment.

More specifically, during low speed straight running, the distant road is rarely irradiated and the road at a short distance can be widely irradiated almost uniformly in the large light distribution pattern Pa3 as shown in FIG. 8(a). On the other hand, during medium and high straight running, the road at a short distance is rarely irradiated and the distant road can be irradiated brightly in the small light distribution pattern Pa4 as shown in FIG. 8(b). By employing such a lighting system structure, the brightness of the low beam light distribution pattern P(L) (or the high beam light distribution pattern) can be reinforced effectively according to the vehicle speed.

What is claimed is:

1. A lighting system for a vehicle having a light source and a reflector for forward reflecting light emitted from the light source and constituted to carry out beam irradiation toward a forward road of the vehicle in a predetermined light distribution pattern, the lighting system comprising:

a movable shade laterally surrounding the light source to shield a part of light emitted from the light source toward a reflecting surface of the reflector, and a shade driving device for moving the movable shade between two positions in a longitudinal direction, wherein light emitted toward an outer peripheral region of the reflecting surface is shielded to permit only light incidence on an inner peripheral region of the reflecting surface when the movable shade is moved to a forward position, while light emitted toward the inner peripheral region of the reflecting surface is shielded to permit only light incidence on the outer peripheral region of the reflecting surface when the movable shade is moved to a rearward position.

2. The lighting system for a vehicle according to claim 1, wherein a beam irradiation position for the forward road of the vehicle is set onto a more distant side when the movable shade is moved to the rearward position than when the movable shade is moved to the forward position.

3. The lighting system for a vehicle according to claim 2, wherein the shade driving device is constituted to move the movable shade to the forward position at a predetermined set vehicle speed or less and to move the movable shade to the rearward position when the set vehicle speed is exceeded.

4. The lighting system for a vehicle according to claim 1, wherein the lighting system is a bending lamp arranged to irradiate a forward road in a turning direction when the vehicle turns.

5. The lighting system for a vehicle according to claim 2, wherein the lighting system is a bending lamp arranged to irradiate a forward road in a turning direction when the vehicle turns.

6. The lighting system for a vehicle according to claim 3, wherein the lighting system is a bending lamp arranged to irradiate a forward road in a turning direction when the vehicle turns.

7. The lighting system for a vehicle according to claim 1 wherein the shade has a cylindrically-shaped section surrounding the light source.

* * * * *